United States Patent [19]

Takano et al.

[11] Patent Number: 4,608,609
[45] Date of Patent: Aug. 26, 1986

[54] APPARATUS FOR RECORDING A COLOR VIDEO SIGNAL

[75] Inventors: Masayuki Takano; Kenji Nakamura, both of Kanagawa, Japan

[73] Assignee: Sony Corporation, Tokyo, Japan

[21] Appl. No.: 524,558

[22] Filed: Aug. 19, 1983

[30] Foreign Application Priority Data

Aug. 20, 1982 [JP] Japan .................................. 57-145100

[51] Int. Cl.$^4$ ........................................... H04N 5/782
[52] U.S. Cl. .................................... 358/320; 358/310; 360/8; 360/9.1
[58] Field of Search ............... 358/310, 320, 321, 323, 358/330, 334, 337; 360/8, 9.1, 33.1

[56] References Cited

U.S. PATENT DOCUMENTS

| | | | |
|---|---|---|---|
| 4,133,009 | 1/1979 | Kittler et al. | 360/9 |
| 4,399,472 | 8/1983 | Yamamoto et al. | 358/320 |
| 4,438,456 | 3/1984 | Yoshinaka | 358/148 |

Primary Examiner—Robert L. Richardson
Attorney, Agent, or Firm—Lewis H. Eslinger; Alvin Sinderbrand

[57] ABSTRACT

A color video signal recording apparatus recording a luminance signal and a chrominance signal on separate tracks in which a pair of chrominance component signals are time-compressed and serially recorded as the chrominance signals. In this case, there are provided a timebase compressor for time-compressing the pair of chrominance component signals and a clock generator for supplying a clock signal to the timebase compressor wherein the frequency of the clock signal is selected to be an integral multiple of the horizontal frequency.

6 Claims, 19 Drawing Figures

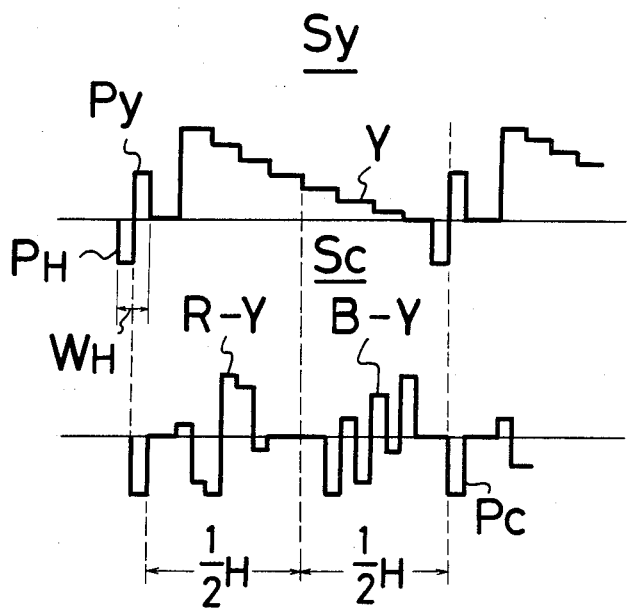
FIG. 2A
FIG. 2B
FIG. 3
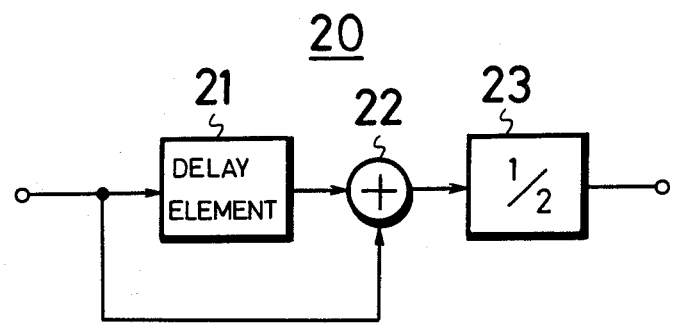

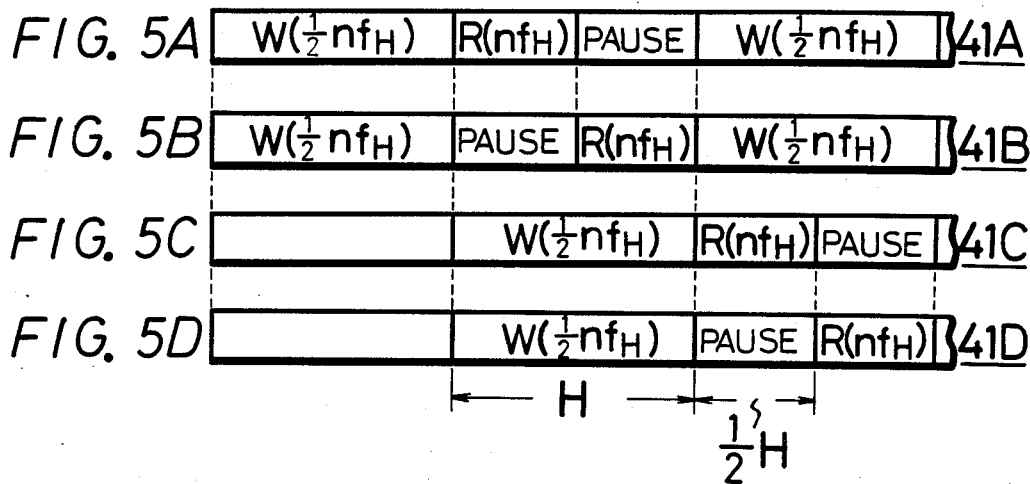
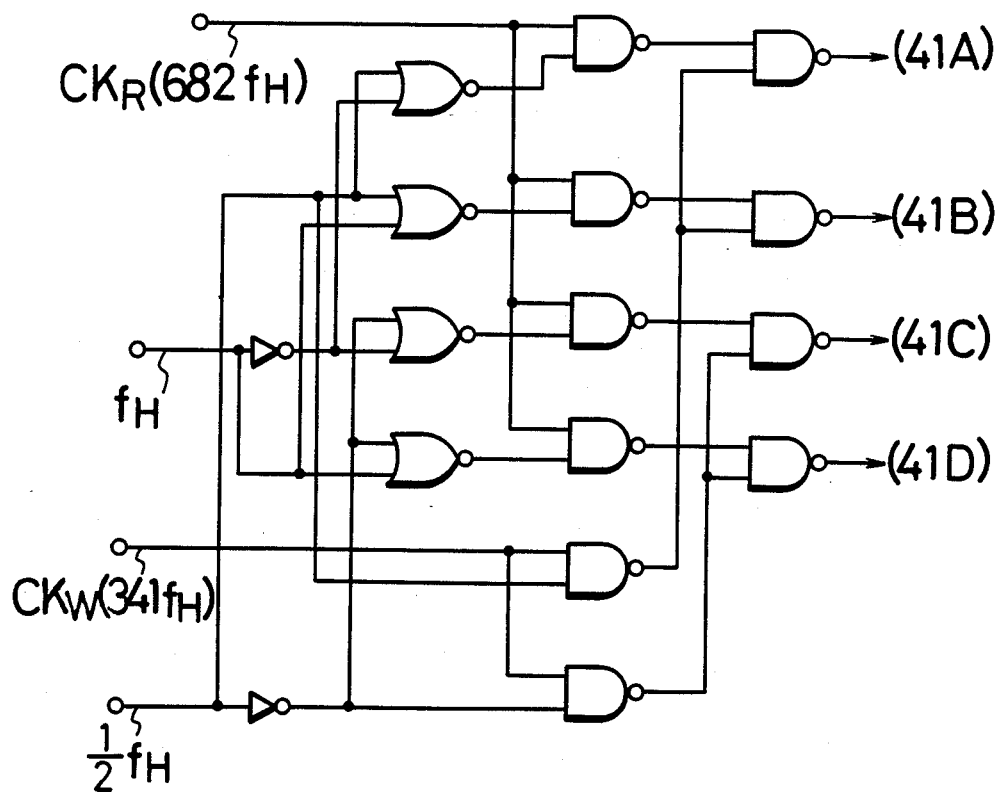

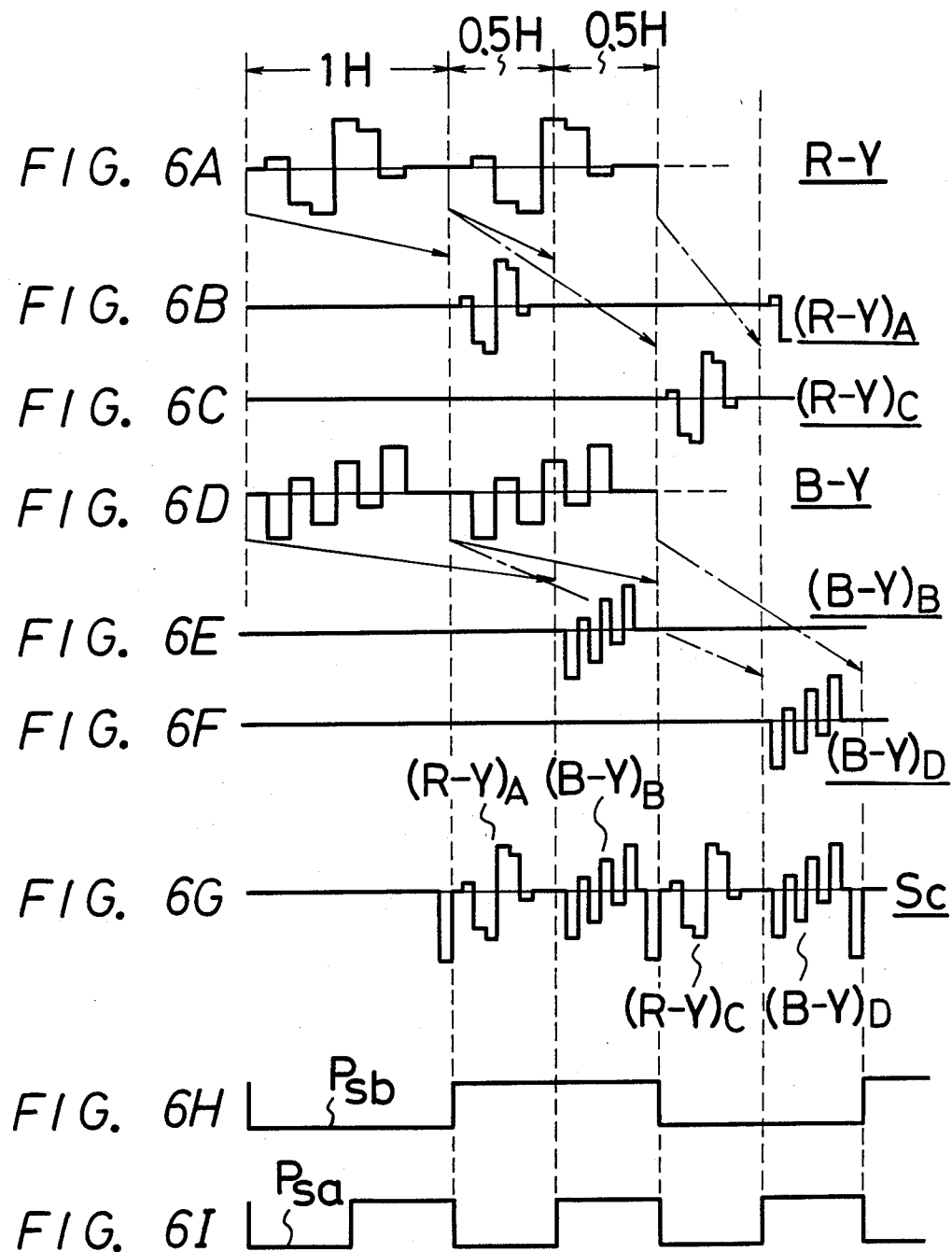

APPARATUS FOR RECORDING A COLOR VIDEO SIGNAL

BACKGROUND OF THE INVENTION

1. Field of the Invention

This invention generally relates to an apparatus for recording a color video signal and in particular is directed to such a recording apparatus in which chrominance component signals are time-compressed and sequentially recorded on a track separate from a luminance component track.

2. Description of the Prior Art

In the art, there has been known a recording method for a color video signal, in which a luminance signal and a pair of chrominance component signals included in a color video signal are separated and then sequentially recorded on separate tracks. In this case, a pair of chrominance component signals such as a pair of color difference signals (R−Y) and (B−Y) are respectively compressed in timebase to the half (½) thereof, arranged sequentially and alternately with respect to each and then recorded on one track.

A reference clock signal employed in a timebase compressor which compresses in timebase the pair of color difference signals (R−Y) and (B−Y) is generally related to a color subcarrier signal. If the frequency of the reference clock signal is the frequency mfsc (m is an integer) which is related to a color subcarrier frequency fsc, a problem occurs in the circuit configuration of the recording apparatus and so on.

When the reference clock signal is formed on the basis of the color subcarrier frequency fsc, the timebase compressor must be constructed in accordance with respective television standard systems. In other words, as will be apparent, the NTSC (national television systems committee) system and the CCIR (international radio consultative committee) system each have different color subcarrier frequencies fsc depending on each television standard system. Accordingly, if the reference clock signal is formed on the basis of such color subcarrier frequency fsc and is used in driving the timebase compressor, the compressing ratio is different in each television standard system and a desired compressing ratio can not be obtained. Therefore, depending on the television standard system, the circuit configuration and constant or the like must be changed greatly. Thus, the timebase compressor can not be used common to different television standard systems, which fact then causes a serious disadvantage in coping with different television standard systems.

Moreover, since the color subcarrier frequency fsc is selected to be an odd multiple of half of the horizontal frequency $f_H$, the timing of the clock signal is displaced by half the amount of the clock signal at every horizontal line. Thus, the position of a reference pulse inserted into the compressed color difference signals and used for matching the timebase of the luminance signal upon reproducing must be shifted at every line, thus making the configuration of a reference pulse generating circuit complicated.

OBJECTS AND SUMMARY OF THE INVENTION

Accordingly, it is an object of the present invention to provide an improved color video signal recording apparatus which overcomes the above-described disadvantages.

Another object of the present invention is to provide a color video signal recording apparatus in which a clock signal used by a timebase compressor for compressing the timebases of a pair of component chrominance signals is formed from the signal whose frequency is independent of the applicable television standard system so that it is not necessary to change the configuration of the timebase base compressor in dependence on such system.

In accordance with an aspect of this invention, chrominance component signals such as (R−Y) and (B−Y) signals are time-compressed and serially recorded within one horizontal duration on a track different from a luminance component track. The pair of chrominance component signals (R−Y) and (B−Y) being recorded as mentioned above are written in delay or storage elements, which form a timebase compressor, in response to a write clock signal, read out therefrom in response to a read clock signal having the frequency selected to be an integral multiple of that of the write clock signal thereby generated as a pair of color difference signals (R−Y) and (B−Y) having the timebases compressed, which are further selected by a switching circuit so as to provide the chrominance component signals mentioned as above. The write and read clock signals, each having the frequency of an integral multiple of the horizontal frequency of each television standard system, are both generated from a clock generator. Thus, even if the horizontal frequency is different depending on the kinds of the television standard system, the number of the clock signals generated from the clock generator is the same within one horizontal period and also the compressing ratio of the signal during one horizontal period in the timebase compressor being driven by such clock signal becomes the same so that the timebase compressor and the clock generator for generating the clock signal to drive the above timebase compressor do not have to be changed depending on the kinds of the television standard systems.

In accordance with another aspect of this invention, if an oscillatory frequency is given as $nf_H$ (n is an integer and $f_H$ a horizontal frequency), the timing of the read clock signal $CK_R$ becomes equal in both odd and even lines so that the position of a reference pulse inserted into the compressed color difference signals for matching the timebase of the luminance signal upon reproducing becomes always constant at every line.

The other objects, features and advantages of the present invention will become apparent from the following description taken in conjunction with the accompanying drawings through which the like references designate the same elements and parts.

BRIEF DESCRIPTION OF THE DRAWINGS

FIGS. 2A and 2B are respectively waveform diagrams showing a luminance signal and compressed color difference signals recorded by the recording apparatus in FIG. 1;

FIG. 3 is a block diagram showing an example of a level corrector used in the reproducing apparatus shown in FIG. 1;

FIGS. 5A to 5D are respectively timing charts showing the written-in and read-out timing of delay or storage elements used in the timebase compressor seen in FIG. 4;

FIGS. 6A to 6I are respectively timing charts of the timebase compressor and the control circuit seen in FIG. 4; and FIG. 7 is a block diagram showing an example of a gate circuit seen in FIG. 4.

DESCRIPTION OF THE PREFERRED EMBODIMENT

Now, an embodiment of a color video signal recording apparatus according to the present invention will hereinafter be described in detail with reference to the attached drawings. In this case, color difference signals (R−Y) and (B−Y) are employed as a pair of chrominance component signals.

Figure 1:
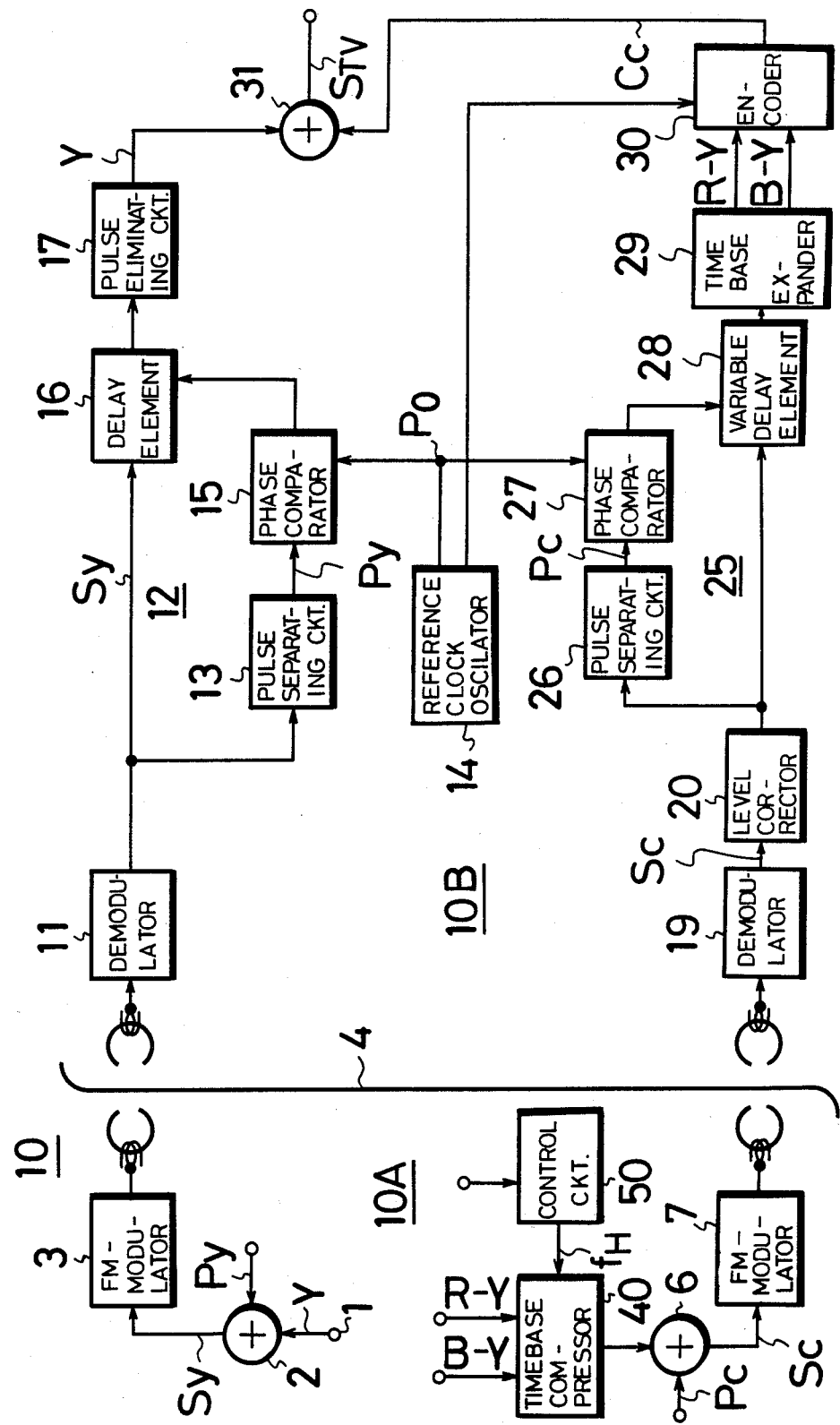
FIG. 1 is a block diagram showing a recording apparatus and a reproducing apparatus according to the present invention.

FIG. 1 is a block diagram showing an example of a recording/reproducing apparatus 10 to which the present invention is applied wherein reference numeral 10A designates a recording apparatus and reference numeral 10B a reproducing apparatus.

In the recording apparatus 10A, a luminance signal Y containing therein a horizontal synchronizing pulse $P_H$ supplied to a terminal 1 is added to a first reference pulse $P_Y$, which is useful for matching timebases between the channels, by an adder 2. The first reference pulse $P_Y$, as shown in FIG. 2A, is added to the luminance signal Y at the latter half portion of the horizontal synchronizing pulse $P_H$ with its polarity opposite to that of the horizontal synchronizing pulse $P_H$.

The reason why the reference pulse $P_Y$ having the positive polarity is inserted into the luminance signal Y is to facilitate the synchronizing separation of this reference pulse $P_Y$ and to prevent a spurious signal from being caused in the low frequency band component of the luminance signal Y by the reference pulse $P_Y$, thus removing the occurrence of moiré.

In FIG. 2A, reference letter $W_H$ designates the pulse width of the horizontal synchronizing pulse $P_H$, in which example the pulse width of the reference pulse $P_Y$ is selected to be half of the pulse width $W_H$.

A luminance signal $S_Y$ having the reference pulse $P_Y$ inserted thereinto is FM-modulated by an FM modulator 3 and then recorded on a tape 4 by a head $H_Y$.

On the other hand, color difference signals (R−Y) and (B−Y) are compressed in timebase to the half by a timebase compressor 40, which is controlled by a control circuit 50 having the horizontal frequency $f_H$ as its reference signal. The color difference signals (R−Y) and (B−Y) after being compressed in timebase are arranged alternately and added with a second reference pulse $P_C$ by an adder 6 to thereby form a compressed color difference signal $S_C$ as shown in FIG. 2B.

The second reference pulse $P_C$ is inserted into the compressed color difference signal $S_C$ at the same position in time as that of the first reference pulse $P_Y$ for the purpose of matching the timebases between the channels. In this embodiment, the second reference pulse $P_C$ is inserted with negative polarity.

The compressed color difference signal $S_C$ is FM-modulated by an FM modulator 7 and then recorded on the tape 4 by a head $H_c$. In this case, a record track for the compressed color difference signal $S_C$ is formed to adjoin the record track of the luminance signal $S_Y$.

The reproducing apparatus 10B will be described next.

The reproduced luminance signal $S_Y$ by a head $H_Y$ which was FM-modulated as described before is demodulated by a demodulating circuit 11 and then supplied to a timebase corrector (TBC) 12 which arranges the timebase of the reproduced luminance signal $S_Y$ containing jitters correct. To this end, the reproduced luminance signal $S_Y$ is supplied to a pulse separating circuit 13 in which the first reference pulse $P_Y$ is separated therefrom. This first reference pulse $P_Y$ is compared in phase with a timebase reference pulse $P_O$, which is derived from a reference clock oscillator 14, by a phase comparator 15. The output therefrom is used to control the delay time of a variable delay element 16 to which the reproduced luminance signal $S_Y$ is supplied.

The reproduced luminance signal $S_Y$ having the correct timebase and delivered from the delay element 16 is supplied to a pulse eliminating circuit 17 at which the first reference pulse $P_Y$ is removed from the luminance signal $S_Y$. Thus, the horizontal synchronizing pulse $P_H$ restores the ordinary pulse width $W_H$.

On the other hand, the reproduced compressed color difference signal $S_C$ by a head $H_c$, which was FM-modulated as described before, is demodulated by a demodulating circuit 19 and then supplied to a level corrector 20 at which the level fluctuation between the lines caused by the compressing operation is corrected. Namely, the timebase compressor 40 is formed of a plurality of delay or storage elements as will be described later, and the transmission characteristics and the temperature characteristics of those plural, delay elements are usually different slightly from one another so that the output level of each delay element becomes different due to the difference of the characteristics. This level difference causes a so-called line crawling on the picture screen. In order to prevent this line crawling from occurring, the level corrector 20 is provided to permit the level between the lines to be averaged.

FIG. 3 shows an example of the level corrector 20 which comprises a delay element 21 having a delay time of one horizontal scanning period (1H), an adder 22 and a level adjuster 23 for decreasing the added output level to the half so as to add the compressed color difference signals (R−Y) and (B−Y) on adjacent horizontal lines to each other.

The compressed color difference signal $S_C$ thus averaged is corrected in timebase by a TBC 25. To this end, the compressed color difference signal $S_C$ is supplied to a pulse separating circuit 26 at which the second reference pulse $P_C$ is separated from the signal $S_C$. This second reference pulse $P_C$ is compared in phase with the reference pulse $P_0$ at a phase comparator 27 by which output the delay time of a variable delay element 28, to which the signal $S_C$ is applied from the corrector 20, is controlled to form the compressed color difference signal $S_C$ having no jitter.

The compressed color difference signal $S_C$ with the timebase corrected is then expanded in timebase by a timebase expander 29 to restore the original timebase and separated into the color difference signals (R−Y) and (B−Y), respectively. These color difference signals (R−Y) and (B−Y) are supplied to an encoder 30 which then generates a carrier chrominance signal $C_C$. This carrier chrominance signal $C_C$ is frequency-multiplexed on the luminance signal Y by a composer 31, thus a known color video signal $S_{TV}$ being reproduced.

Figure 4:
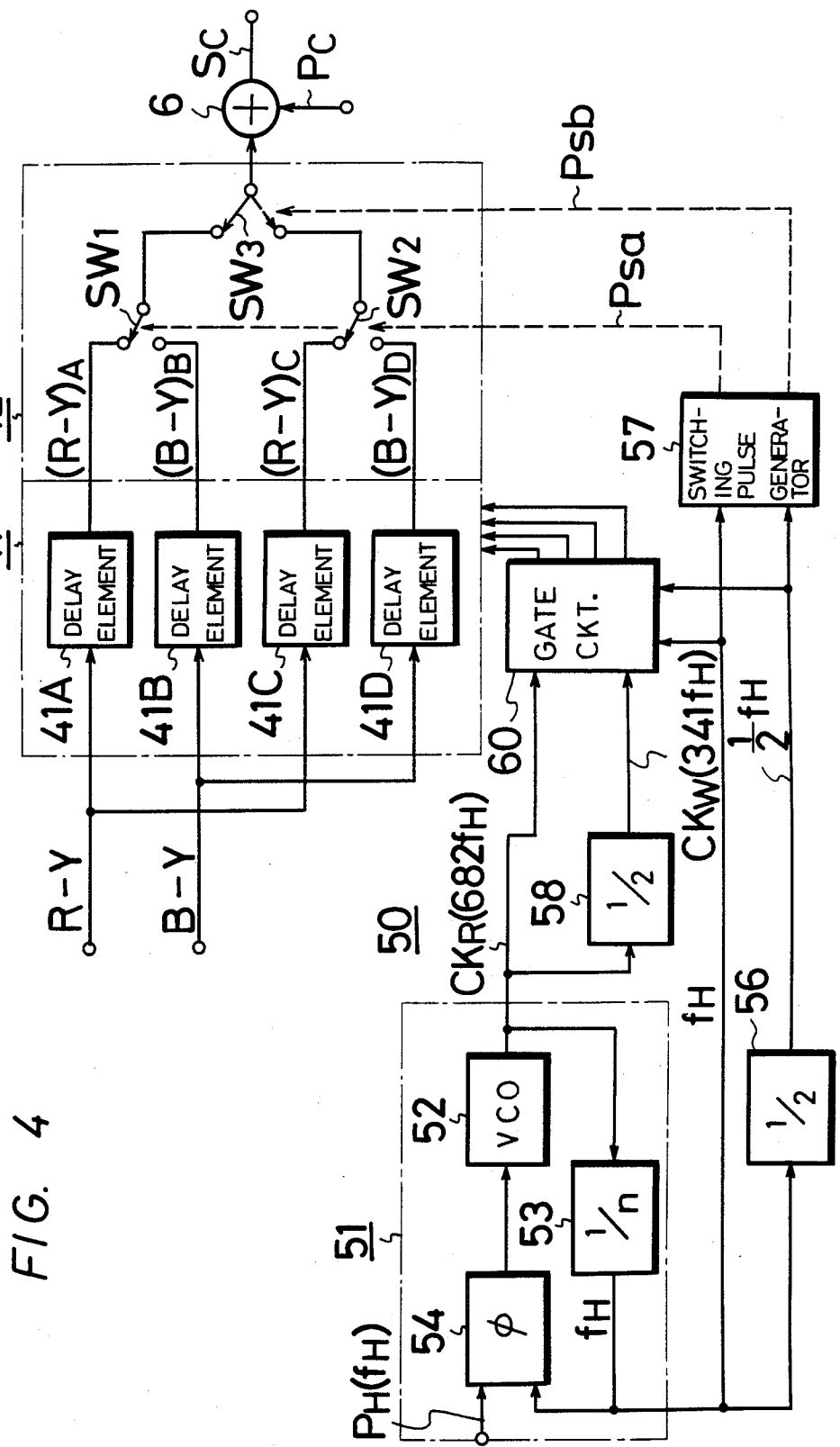
FIG. 4 is a block diagram showing more fully a timebase compressor and a control circuit thereof used in the recording apparatus seen in FIG. 1.

FIG. 4 is a schematic block diagram showing an example of the timebase compressor 40 and the control circuit 50 thereof as mentioned before. As seen in the figure, the timebase compressor 40 comprises a delay or storage circuit 41 consisting of four delay elements 41A to 41D in which the color difference signal (R−Y), for example, is supplied to the first and third delay elements 41A and 41C, while the color difference signal (B−Y) is supplied to the second and fourth delay elements 41B and 41D. Each of the delay elements 41A to 41D is formed of a CCD (charge-coupled device).

A switching circuit 42 is provided at the rear stage of the delay elements 41A to 41D to select the compressed color difference signals as the delay outputs and to arrange them sequentially and alternately. In this embodiment, the switching circuit 42 comprises a first switch SW1 for selecting the outputs of the first and second delay elements 41A and 41B, a second switch SW2 for selecting the outputs of the third and fourth delay elements 41C and 41D and a third switch SW3 for further selecting the selected outputs from the switches SW1 and SW2.

The timebase compressing operation for the color difference signals (R−Y) and (B−Y) by the compressor 40 using these delay elements 41A to 41D will be described with reference to FIGS. 5A to 5D and FIGS. 6A to 6I.

As shown in FIGS. 5A to 5D, the write modes of the delay elements 41A to 41D are selected at every line in such a manner that the first and second delay elements 41A and 41B are put into the write mode at every odd line, while the third and fourth delay elements 41C and 41D are put into the write mode at every even line.

In the period during which the third and fourth delay elements 41C and 41D are respectively placed in the write mode, the first and second delay elements 41A and 41B are placed in the read mode. In this case, since the frequency $f_R$ of a read clock signal $CK_R$ is selected to be twice the frequency $f_W$ of a write clock signal $CK_W$, the input color difference signals (R−Y) and (B−Y) are outputted under the state that the timebases thereof are compressed to the half.

In order to prevent the read mode of the first and second delay elements 41A and 41B from being overlapped, according to this embodiment, the former half period (0.5 H ) of the one horizontal scanning period (1 H ) is assigned to the read mode of the first delay element 41A, while the latter half period thereof is assigned to the read mode of the second delay element 41B.

Accordingly, when the color difference signals (R−Y) and (B−Y) as shown in FIGS. 6A and 6D are inputted to the first and second delay elements 41A and 41B, color difference signals $(R-Y)_A$ and $(B-Y)_B$ the timebases of which are compressed at timing shown in FIGS. 6B and 6E respectively appear from the delay elements 41A and 41B. These color difference signals $(R-Y)_A$ and $(B-Y)_B$ are alternately selected in turn by the first switch SW1 and further selected by the third switch SW3 which is changed in position at every other horizontal scanning periods (1 H ), thereby arranged into a series of signals as shown in FIG. 6G.

When the first and second delay elements 41A and 41B are placed in the write mode, the third and fourth delay elements 41C and 41D are set in the read mode. Since the read modes thereof and the selecting timing of the second switch SW2 are selected as the same as described above, the third and fourth delay elements 41C and 41D generate color difference signals $(R-Y)_C$ and $(B-Y)_D$ the timebases of which are compressed at timings shown in FIGS. 6C and 6F, which are then arranged into a series of signals as shown in FIG. 6G. Thus, at every odd line, the third switch SW3 is changed in position as shown by broken lines in FIG. 4.

The control circuit 50 which establishes the above-mentioned write, read and switching modes will be described with reference to FIG. 4 again.

The control circuit 50 includes a reference clock generator 51 formed of a PLL (phase locked loop) wherein the oscillatory frequency of a VCO 52 (voltage-controlled oscillator) is selected to be an integral multiple of the horizontal frequency $f_H$. It is needless to say that the integer is selected to be the same as the bit number of the delay circuit 41 and is selected to be 682 in this embodiment. The oscillatory output from the VCO 52 is counted down to be 1/n, for example, 1/682 by a counter 53, and the counted output $f_H$ therefrom is compared in phase with the horizontal synchronizing pulse $P_H$ separated from the reproduced luminance signal $S_Y$, thus the VCO 52 being controlled by the compared output therefrom.

The counted output $f_H$ and the counted output $\frac{1}{2} f_H$ resulting from counting down the $f_H$ to the half by a counter 56 are both supplied to a switching pulse generating circuit 57 which then generates switching pulses Psa and Psb serving to change the first to third switches SW1 to SW3 in position at the timings shown in FIGS. 5 and 6A. The switching pulse Psa has the same frequency as the horizontal frequency $f_H$ as shown in FIG. 6I and is used to control the first and second switches SW1 and SW2. More specifically, when the switching pulse Psa is at "L" (low) level, the first switch SW1 is connected to the output of the first delay element 41A, while the second switch SW2 is connected to the output of the third delay element 41C as shown in FIG. 4. On the other hand, when the switching pulse Psa is at "H" (high) level, the first switch SW1 is connected to the output of the second delay element 41B, while the second switch SW2 is connected to the output of the fourth element 41D.

Meanwhile, the switching pulse Psb has the same frequency as the $\frac{1}{2} f_H$ as shown in FIG. 6H and is used to control the third switch SW3. When the switching pulse Psb is at "H" level, the third switch SW3 is connected to the output of the first switch SW1 as shown in FIG. 4 by the solid line, while when the switching pulse Psb is at "L" level, the third switch SW3 is connected to the output of the second switch SW2 as shown by the broken line in FIG. 4. When the switches SW1 to SW3 are respectively controlled by the switching pulses Psa and Psb, the outputs from the delay elements 41A, 41B, 41C and 41D are selected to be as shown in FIG. 6G.

The oscillatory output having the frequency of 682 $f_H$ derived from the reference clock generator 51, namely, the reference clock signal $CK_R$, is used as a read clock signal for the delay circuit 41. The reference clock signal $CK_W$ resulting from counting down the reference clock signal $CK_R$ to the half by the counter 58 is used as the write clock signal therefor.

The write and read clock signals $CK_W$ and $CK_R$ are respectively supplied to the corresponding delay elements 41A to 41D in response to the lines of the color difference signals (R−Y) and (B−Y) supplied thereto. In this embodiment, a clock gate circuit 60 is provided to allow the corresponding clock signals to be supplied to the corresponding delay elements 41A to 41D during only the write or read mode period as shown in FIGS. 5 and 6.

The gate circuit 60 is formed of a logic gate which employs plural NAND gates and plural NOR gates as shown in FIG. 7.

The clock signals having the frequencies $f_H$ and $\frac{1}{2} f_H$ as well as the write and read clock signals $CK_W$ and $CK_R$ are all supplied to this gate circuit 60 which therefore supplies the corresponding write clock signal $CK_W$ or read clock signal $CK_R$ to the plurality of delay elements 41A to 41D at the timing shown in FIGS. 5A to 5D.

Accordingly, when such gate circuit 60 is employed, it may be considered to remove the switching circuit 42. The switching circuit 42, however, is indispensable. Because, by only switching the operation modes of the delay circuit 41, it is not possible to prevent the write clock signal $CK_W$ and so on applied to the delay circuit 41 upon writing operation from being jumped into the output so that there is a fear that noises can not be avoided sufficiently. If the switching circuit 42 is provided, such fear can be removed positively.

As indicated above, in the present invention the oscillatory frequency of the VCO 52 is selected to be $nf_H$ (n is an, integer and n was given as 682 in the above embodiment). The reason for this is as follows.

Although the horizontal frequency $f_H$ is different depending on each television standard system, the write and read clock signals $CK_W$ and $CK_R$ are both selected to be frequencies of an integral multiple of the horizontal frequency $f_H$ so that the number of clock signals within one horizontal period becomes the same in any television standard system. For example, in the present invention, the write clock signal $CK_W$ has the frequency of 341 $f_H$ and the color difference signals within one horizontal period are written into the delay circuit 41 by 341 clocks. In other words, if the timebase compressor 40 and the control circuit 50 which controls the timebase compressor 40 are used, even when the television standard system is changed from the NTSC system to the CCIR system, only the value $f_H$ in the frequency 341 $f_H$ of the write clock signal $CK_W$ is changed and the number of the clock signals within one horizontal period remains as 341. Moreover, the read clock signal $CK_R$ has the frequency of 682 $f_H$ and the number of the clock signals within one horizontal period is 682 so that the number of the clock signals (682) is not changed depending on the kinds of television standard systems. Thus, the timebases of the color difference signals being read out from the delay circuit 41 are compressed to the half. Accordingly, if the oscillatory frequency is given as n $f_H$, the control circuit 50 and the timebase compressor 40 can be used in common in different television standard systems.

If the oscillatory frequency is given as n $f_H$, the timing of the read clock signal $CK_R$ is made the same in both the odd and even lines so that the insertion position of the second reference pulse $P_C$ is constant at all times. Unless the oscillatory frequency is selected to be an integral multiple of the horizontal frequency $f_H$, the insertion position of the second reference pulse $P_C$ must be changed by the amount of $\frac{1}{2}$ clock at every other line, making the circuit system for generating the second reference pulse $P_C$ more complex. Thus, according to the present invention, the pulse generating circuit system can be quite simple.

Furthermore, since the switching pulses Psa and Psb can easily be formed of the counted outputs having the horizontal frequencies $f_H$ and $\frac{1}{2} f_H$, the generating circuit 57 for generating the switching pulses Psa and Psb can be simple.

In the above description, the chrominance component signals being compressed in timebase may be I signal and Q signal, respectively.

The above description is given on a single preferred embodiment of the invention but it will be apparent that many modifications and variations could be effected by one skilled in the art without departing from the spirit or scope of the novel concepts of the invention, so that the scope of the invention should be determined by the appended claims only.

We claim as our invention:

1. Apparatus for recording a color video signal having a horizontal frequency $f_H$ in which a luminance signal and a chrominance signal are recorded on separate channels and at least two chrominance component signals are compressed in timebase and arranged alternately and sequentially for recording on the track as said chrominance signal; said apparatus comprising:
   clock signal generating means for generating a write clock signal having a frequency $N \cdot f_H$ and a read clock signal having a frequency $m \cdot N \cdot f_H$, where N and m are integers;
   timebase compressing means for writing said chrominance component signals in response to said write clock signal and reading them out in response to said read clock signal, whereby the timebases of said chrominance component signals are compressed to 1/m; and
   switching means for alternately selecting said chrominance component signals with the timebases compressed by said timebase compressing means ane arranging said chrominance component signals alternately.

2. Apparatus for recording a color video signal according to claim 1 further comprising counting-down means for counting down said clock signals wherein said switching means is controlled on the basis of an output from said counting-down means.

3. Apparatus for recording a color video signal according to claim 2, wherein said timebase compressing means is formed of a plurality of storage elements.

4. Apparatus for recording a color video signal according to claim 3 further comprising control means for selectively supplying said write clock signal to said storage elements when said storage elements are in the write mode and selectively supplying said read clock signal to said storage elements when said storage elements are in the read mode.

5. Apparatus for recording a color video signal according to claim 4, wherein said chrominance component signal is formed of first and second signals, a pair of said storage elements are assigned to each of said first and second signals, wherein when one of each of said pair of storage elements is in the write mode, the other is in the read mode and alternately changed to the write mode and read mode at every 1H periods to obtain said first and second signals having the timebases compressed.

6. Apparatus for recording a color video signal according to claim 5, wherein said first and second signals are read out from said storage elements by said read clock signal having the frequency $(2n \cdot n \cdot f_H$ where N is an integer and $f_H$ is horizontal frequency) twice the frequency ($N \cdot f_H$) of said write clock signal for writing said first and second signals in said storage elements and wherein said read mode for said first signal is set in the first half of one horizontal period and said read mode for said second signal is set in the second half of said one horizontal period to thereby alternately obtain said first and second signals the timebases of which are compressed to the half.

* * * * *